Figure 1:
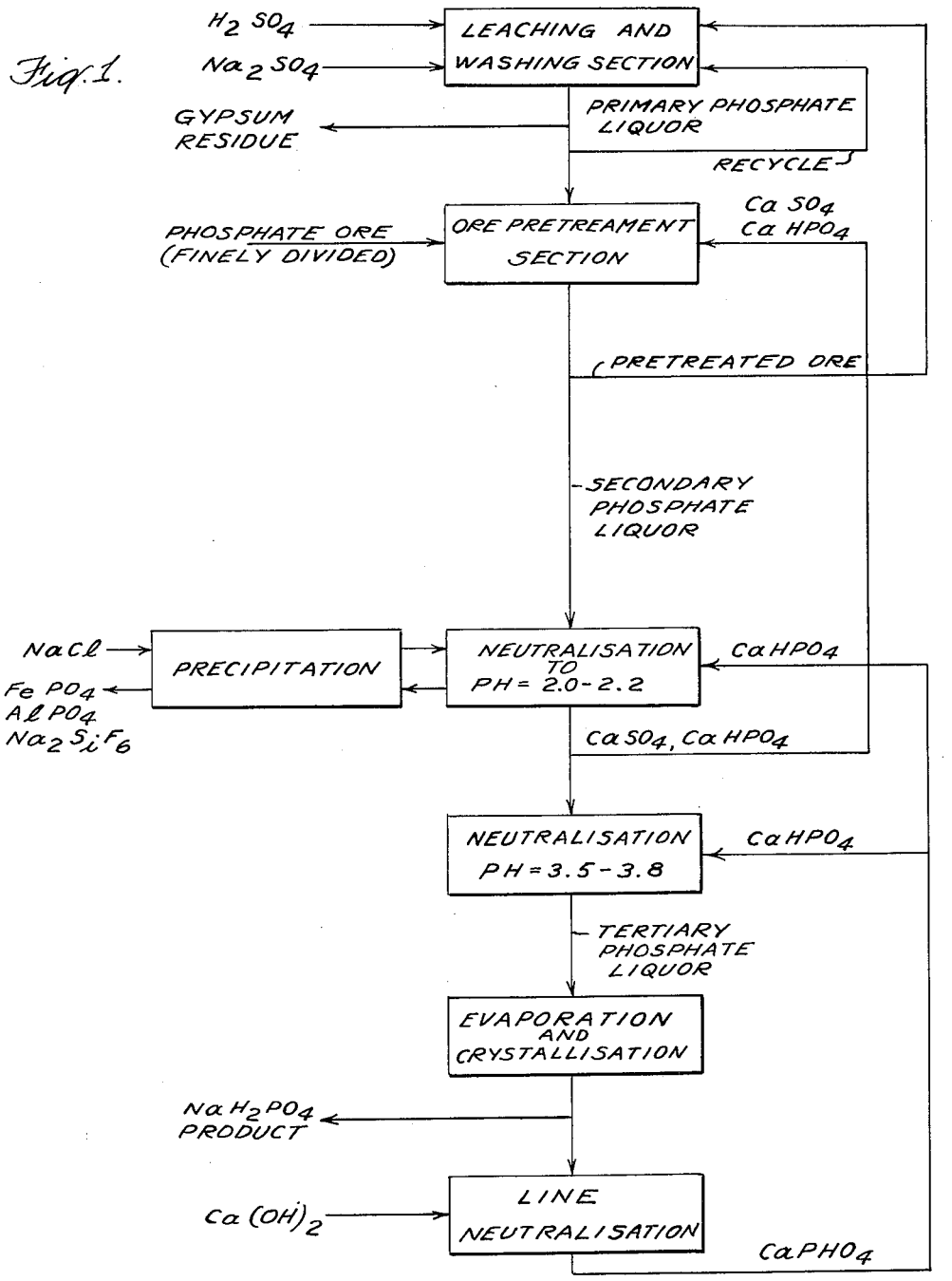

3,211,523
PRODUCTION OF MONOSODIUM PHOSPHATE
Francis L. Melvill, 311 Mostyn Hall, Princess Place,
Parktown, Johannesburg, Republic of South Africa
Filed Aug. 22, 1961, Ser. No. 133,235
6 Claims. (Cl. 23—107)

This invention relates to a method for the production of monosodium phosphate having a low fluorine content. The invention relates more generally to the production of alkali metal dihydrogen phosphates by a process or processes directly analogous to the production of monosodium phosphate.

As a feature of the invention, production from apatite of a monosodium phosphate can be achieved with a sufficiently low fluorine content to allow its use for potable purposes.

In accordance with this invention, there is provided a method for the production of alkali metal dihydrogen phosphate from raw calcium phosphate containing ores comprising the steps of treating each of successive batches of the ore with sulphuric acid and excess alkali metal sulphate to form a slurry, separating the primary liquor from the slurry, reacting the primary liquor with further calcium phosphate containing ore, separating secondary liquor from the slurry so obtained, neutralizing the secondary liquor to yield a tertiary liquor and recovering the alkali metal dihydrogen phosphate from the tertiary liquor so obtained.

The terms "neutralizing" and "neutralization" used in this specification and claims mean a reduction in acidity as reflected by an increase in pH to a new level. They do not necessarily imply an alterating of pH to 7 which is usually the accepted neutral point, and in fact the prevailing pH figures after neutralization operations in accordance with this invention are generally less than 7.

In the preferred form of this invention the process consists of three basic operations, viz., a leaching, a neutralizing operation and a phosphate recovery operation, all of which are described in detail below as applied to the production of monosodium phosphate.

In the conventional wet acid process, the calcium phosphate raw material is reacted with sulphuric acid to yield a liquor containing substantially the whole of the dissolved phosphate in the form of a solution of phosphoric acid ontaminated with metal and other impurities of which iron, aluminium and the silicofluoride ion are the most important. The minimum amount of sulphuric acid required to effect extraction of the phosphate is 3 mols per mol of $P_2O_5$ rendered soluble as indicated in Equation I.

$$Ca_3(PO_4)_2 + 3H_2SO_4 = 2H_3PO_4 + 3CaSO_4 \qquad (I)$$

An excess over 3 mols is always consumed in the reaction of the acid with impurities in the raw material such as calcium fluoride, iron, alumina, etc.

Conventionally, the phosphoric acid liquor being produced as above is neutralized to produce the appropriate sodium salt using either sodium carbonate or sodium hydroxide. The effect of this neutralization is to precipitate a substantial proportion of the phosphate previously rendered soluble in the form of iron and aluminium phosphates which form a voluminous precipitate which is difficult to wash free from soluble phosphate. Thus the amount of these and ohter metals rendered soluble in the leaching operation materially affects the extent of the losses of $P_2O_5$ sustained in neutralization.

In the application of this invention, the leaching operation is effected with a reduced amount of sulphuric acid which is added at a slow rate and in one or more fine streams, and by the use of sodium sulphate which serves as a source of sodium and as a means of insuring the recovery of satisfactory yields of soluble phosphate even at the low acid to $P_2O_5$ ratios which prevail. The initial reactions involved proceed partly as in Equation I above and partly as in Equation II below.

$$Ca_3(PO_4)_2 + 2H_2SO_4 + Na_2SO_4 = 2NaH_2PO_4 + 3CaSO_4 \qquad (II)$$

It will be noted that the theoretical minimum sulphuric acid requirement indicated by Equation II is only 2 mols per mol of $P_2O_5$ rendered soluble.

From the above it is apparent that the solution produced when carrying out the process contains both monosodium phosphate and free phosphoric acid, and it has been shown to have a final pH in the region of 0.5–1.0 and normally 0.8–1.0.

It is a feature of the invention that the liquor so produced shall contain unreacted sodium sulphate and shall be reacted with fresh ore in order to make the best use of the free phosphoric acid present in solution therein. On reaction with fresh ore this acid reacts and the pH increases to between 1.5 and 1.6. The reaction which takes place appears to proceed substantially in accordance with Equation III below.

$$Ca_3(PO_4)_2 + 4H_3PO_4 + 3Na_2SO_4 = 6NaH_2PO_4 + 3CaSO_4 \qquad (III)$$

In any event the resultant liquor usually contains less than 50% of its $P_2O_5$ content as free phosphoric acid.

It is a further feature of the invention that the secondary phosphate liquor so produced containing free sodium sulphate may be neutralized with dicalcium phosphate, any more basic calcium phosphate, or slaked lime in order to yield a liquor which contains additional monosodium phosphate produced substantially in accordance with Equation IV below.

$$H_3PO_4 + CaHPO_4 + Na_2SO_4 = 2NaH_2PO_4 + CaSO_4 \qquad (IV)$$

Recovery of the monosodium phosphate may also be effected by neutralization of the secondary phosphate liquor with sodium carbonate or sodium hydroxide in a conventional manner and to the point where the monosodium phosphate can be crystallized.

The above reaction IV proceeds as indicated as long as the pH of the resultant slurry product is below about 1.3. When the pH exceeds this, it is necessary to use an excess of dicalcium phosphate in order to effect neutralization and this yields an insoluble equilibrium product which is a mixture of dicalcium phosphate and calcium sulphate. The proportion of the former in the mixture increases progressively as the end pH of the reaction product increases from about 1.3 and the indications are that the reaction is completely reversed at a pH of 8 where the solid product is substantially dicalcium phosphate.

Because of the equilibrium condition which prevails above a pH of about 1.3, the invention provides for the neutralization to be effected in more than a single stage, the liquid and the solid equilibrium product travelling substantially counter-current to each other. Assuming an end pH of 3.8 is desired for a liquor having an initial pH of 1.5, the operation is substantially as follows:

(1) In the final stage of neutralization the phosphate liquor from the penultimate stage is reacted with a substantially pure neutralization reagent such as dicalcium phosphate in an amount necessary to yield a slurry having a pH of about 3.8. A portion of the insoluble dicalcium phosphate will be converted to insouble calcium sulphate.

(2) In the penultimate stage of neutralization the phosphate liquor produced by the immediately preceding stage is reacted with the solid equilibrium product from the final stage. In so doing an increased amount of the dicalcium phosphate is converted to the insoluble sulphate and the resultant solid calcium sulphate, dicalcium phosphate equilibrium product passes to an earlier stage of the process. The liquor produced is fed to the last stage.

(3) The above procedure is repeated as often as is necessary to obtain the desired maximum economy until a solid equilibrium product obtained from the first stage is produced. This will contain less dicalcium phosphate than a similar product from the later stages; but as the pH at this stage is necessarily above 1.3 the amount will be appreciable and will be sufficient to justify the solid product being recycled to the leaching operation to effect the recovery of the contained phosphate.

A further feature of the invention is the use of the tertiary phosphate liquor produced as described above (by the penultimate and final stages of neutralization) to yield dicalcium phosphate. A portion of this liquor is reacted with calcium hydroxide slurry in accordance with Equation V below.

$$2NaH_2PO_4 + Ca(OH)_2 = Na_2HPO_4 + CaHPO_4 + 2H_2O \quad (V)$$

Either or both of the products of the above reaction may be used to neutralize the secondary phosphate liquor, (as Equation IV above), but it is often more economical to recover the disodium phosphate as such and to use only the dicalcium salt as indicated above.

An extension of the invention is the production from sodium chloride of the sodium sulphate required for the process. When this is done the requisite amount of chloride salt is reacted with a predetermined amount of sulphuric acid (which is in excess of that required to complete the reaction) indicated by Equation VI below.

$$NaCl + H_2SO_4 = NaHSO_4 + HCl \quad (VI)$$

The hydrochloric acid is removed as a vapour and is absorbed in a water slurry containing an excess of fresh ore. The absorbed acid reacts with the ore in accordance with Equation VII.

$$Ca_3(PO_4)_2 + (6+x)HCl = 3CaCl_2 + 2H_3PO_4 + xHCl \quad (VII)$$

In the above equation $x$ represents the excess acid present at equilibrium.

The liquor recovered after the above reaction is complete is then neutralized with lime slurry or calcium carbonate in accordance with Equation VIII below.

$$2H_3PO_4 + 3CaCl_2 + xHCl + (2+0.5x)Ca(OH)_2 = (3+0.5x)CaCl_2 + 2CaHPO_4 + (4+x)H_2O \quad (VIII)$$

The insoluble calcium phosphate produced as above is recovered from the calcium chloride solution and is then used either as a neutralizing agent as indicated above or as an additional source of $P_2O_5$ which requires a minimum of acid for its recovery when it is reacted with sulphuric acid in the presence of sodium sulphate in accordance with Equation IX.

$$2CaHPO_4 + Na_2SO_4 + H_2SO_4 = 2CaSO_4 + 2NaH_2PO_4 \quad (IX)$$

The mixture of sodium bisulphate and sulphuric acid made as indicated in Equation VI contains sodium sulphate and sulphuric acid in the proportion in which each is required in the process and if kept at an elevated temperature can be fed to the leaching operation as a liquid by conventional means. This replaces the separate addition of the two reagents.

A further extension of the invention is the use in the leaching operations of sodium sulphate produced by the reaction of sodium carbonate with the calcium sulphate present in the residue from the process. This enables the advantages of the use of sodium sulphate in the leaching operation to be obtained even where the sole source of sodium is the carbonate. The reaction to produce the sulphate is in accordance with Equation X below.

$$CaSO_4 + Na_2CO_3 = CaCO_3 + Na_2SO_4 \quad (X)$$

Figure 2:
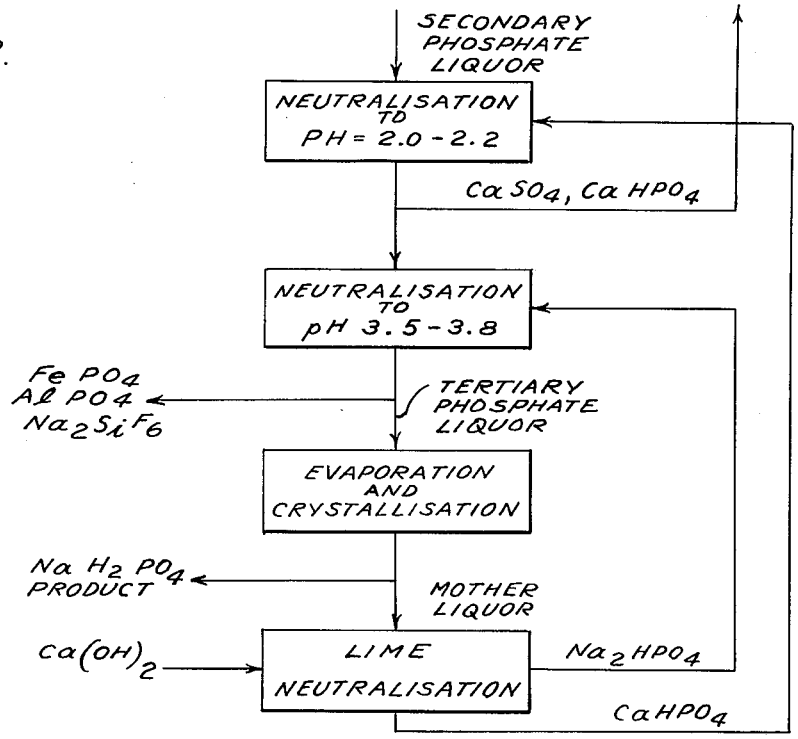
Figure 3:
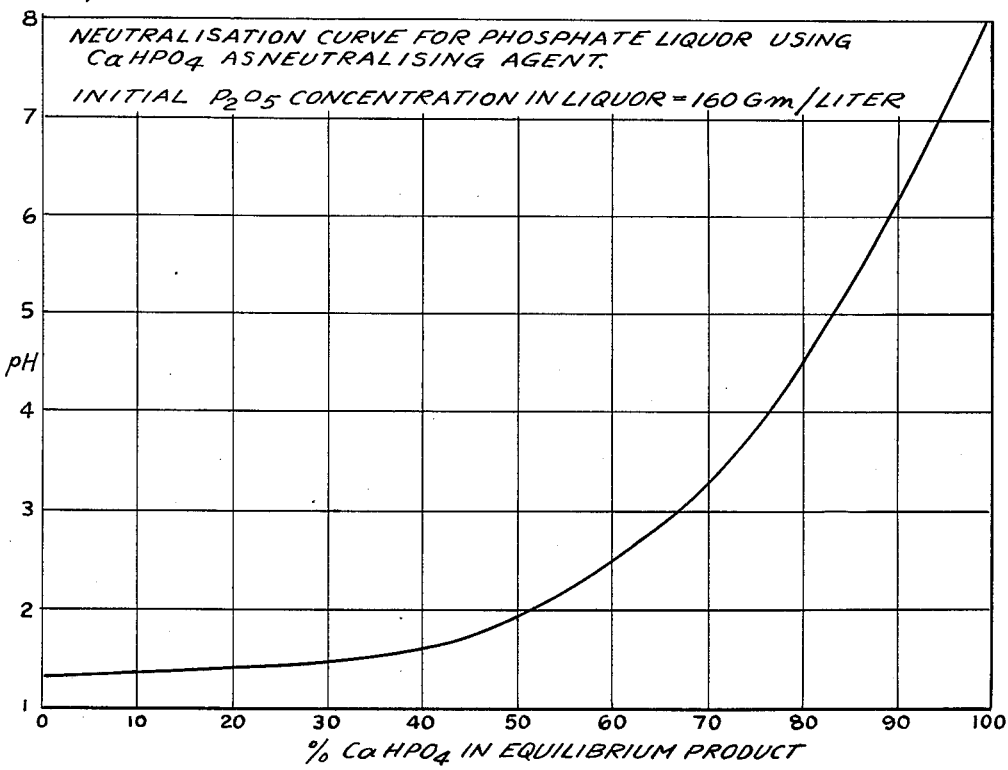

In order to clarify the practical application of the process, the following description of its application in the form of a continuous process in two stages is described, with reference to the accompanying FIGURES 1 and 2 which are block flow diagrams setting forth representative operational steps in the practice of the invention, and in reference to the accompanying FIGURE 3 which graphically illustrates how the composition of the solid equilibrium product varies with pH using a liquor of a given $P_2O_5$ concentration.

LEACHING OPERATION

Referring to FIG. 1, phosphate ore which has been pretreated and which is in a fine state of sub-division is suspended in a liquor made up of wash water derived from the washing of previously produced residue, and primary phosphate liquor, a portion of which is recycled in the process. In this liquor is dissolved a predetermined amount of sodium sulphate. The amount of liquor used is determined by the volume of the recycle stream and is sufficient to ensure that the final slurry produced after the addition of the sulphuric acid is free flowing and does not take on a porridge-like consistency.

In a preferred application of the invention the proportions of wash water and ore are such as will yield according to Equations I and II a primary phosphate liquor containing between 100 and 200 gm. of $P_2O_5$ per liter of solution.

To this slurry which is agitated and maintained at a temperature between 60° C. and 70° C. is added sulphuric acid at a slow rate preferably in the form of one or more very fine streams. The rate of addition of the acid and the capacity of the leach vessel, or vessels, are such that the residence time of the slurry in this section is not less than 1 hour and is preferably of the order of 4 hours. During the whole of the passage of the slurry through this section, acid is added to it, the proportion added in each vessel being in proportion to the residence time of the slurry therein.

The amount of sulphuric acid so added is normally between 2 and 3 mols per mol of $P_2O_5$ contained in the ore fed to the plant and is adjusted accurately to represent the maximum economy having due regard to the proportions of $P_2O_5$ rendered soluble. It varies with the amount and nature of the non-phosphate material in the ore feed.

This slow addition of the acid in one or more fine streams is effective in yielding the following results:

(a) The particle size of the insoluble calcium sulphate produced is allowed to build up and this facilitates its separation from the phosphate liquor.

(b) It eliminates or reduces the tendency to form localized zones of low pH liquor wherein dissolution of unwanted impurities is favoured.

(c) It eliminates or reduces the tendency to form localized zones of high temperature wherein the same effect is obtained.

(d) It enables the maintenance in the leach slurry of a pH which represents the minimum required to effect economical recovery of $P_2O_3$ and ensures the presence in the solution at all times of a minimum amount of sulphuric acid. All these are effective in limiting the dissolution of unwanted impurities.

On completion of the addition of the appropriate amount of sulphuric acid, the resultant slurry is held at the same elevated temperature for a minimum period of 1 hour. At the end of this period the liquid and solid components of the resultant slurry are separated by conventional means, and the latter so washed with a predetermined amount of water to yield the wash liquor used to make up the original slurry.

The primary phosphate liquor comprising the liquid component is allowed to react according to Equation III for a minimum of 1 hour with finely divided fresh ore at a temperature between 60° C. and 70° C. The resultant slurry is separated into solid pretreated ore and secondary phosphate liquor. The former is recycled to form a part or the whole of the feed in a succeeding batch fed to the leaching operation. The secondary phosphate liquor produced passes to the neutralizing section of the plant.

NEUTRALIZING OPERATION

If either sodium carbonate or sodium hydroxide is the cheapest source of sodium available either or both may be used directly to effect neutralization of the secondary phosphate liquor. This is carried out at an elevated temperature in a single stage vessel giving a residence time for the reactants of 1 hour. This and the subsequent treatment of the products follow conventional lines.

If sodium sulphate is the cheapest source of sodium available the neutralization of the secondary phosphate liquor is effected by one or the other of the following methods:

Method I

In the first alternative process step (FIG. 1), the secondary phosphate liquor which must contain unreacted sodium sulphate is reacted in a three stage counter-current operation with dicalcium phosphate along the lines already indicated (Equation IV, et. seq.) to yield a tertiary phosphate liquor having a pH in the range 3.5–3.8. (The dicalcium phosphate may be obtained according to Equation V, or by the steps of Equations VI, VII and VIII.) As indicated above, FIG. 3 shows how the composition of the solid equilibrium product varies with pH. During neutralization, it is necessary to remove from the liquor a substantial proportion of the impurities therein. To effect this, the liquor being subjected to neutralization is treated at its boiling point with solid sodium chloride in an amount adequate to yield a saturated solution. This is effective in precipitating in a granular form a product containing iron and aluminium phosphate and sodium silicofluoride. The latter product is separated from the liquor and the liquor is returned to the point in the neutralization operation from which it was removed.

The unreacted sodium sulphate necessary for this operation (Equation IV) may be derived from an excess of sodium sulphate added during the leaching stage of the process.

All the operations are carried out in vessels of such size that the residence time of the liquor or slurry, as the case may be, in the vessel is a minimum of one hour. The reactions are carried out preferably at a temperature in excess of 60° C.

The liquor treated for the removal of impurities may be taken from and returned to any point in the neutralizing plant always provided that the liquor treated has a pH below 2.2 and preferably one of 2.0 or less.

The desired dihydrogen phosphate product is obtained by evaporation and crystallization following neutralization. The sodium chloride salt added as above is recovered by salting out in the evaporator used to concentrate the neutralized liquor and the evaporator is designed accordingly.

In carrying out the above operation, it is invariably the case that the solid equilibrium product from the first stage of neutralization contains sufficient dicalcium phosphate as to justify the recovery of the contained $P_2O_5$. This recovery is effected by recycling the solid material to the leaching section of the plant where the whole of the contained $P_2O_5$ is rendered soluble according to Equation IX at the lower pH prevailing.

Method II

In the second alternative process step neutralization is effected first using dicalcium phosphate as the neutralizing medium and thereafter using disodium phosphate for the same purpose. The dicalcium salt is used in a multistage operation as described above, to increase the pH to a maximum of 2.2. Thereafter the sodium salt is used in a single stage operation to increase the pH of the liquor to the normal end point in the range 3.5–3.8. (Note FIG. 2)

By carrying out the neutralization in this manner it is possible to effect precipitation of iron and aluminium phosphates and sodium silicofluoride in the second operation and thus secure a precipitate contaminated with a minimum amount of calcium phosphate. This eliminates the use of sodium chloride.

The addition of the disodium phosphate is effected in a single vessel giving a residence time of at least 1 hour and the reaction is carried out at an elevated temperature preferably in excess of 60° C.

PHOSPHATE RECOVERY OPERATION

Having neutralized the secondary phosphate liquor by one or other of the above means to yield a tertiary phosphate liquor having a pH below 4, recovery of the monosodium salt is effected by conventional evaporation and crystallization. However, due to the fact that the feed tertiary liquor contains free phosphoric acid as indicated by its pH being below 4, crystallization of the monosodium salt is effective in yielding a mother liquor having a pH lower than that of the feed liquor. If this fall in pH of the liquor being recycled in the crystallizing operation is not checked the decrease in pH tends to reduce the effectiveness of the recovery of crystals. The decrease in pH is checked by the regular return to the neutralization section of mother liquor having a lower pH. By this means not only is pH control achieved, but the build up of impurities in the crystallizing circuit is avoided as each neutralization of recycled liquor precipitates from it its quota of impurities.

The production of the dicalcium phosphate and the disodium phosphate required for neutralization is conventional and in accordance with Equation V above except that it may be advisable to carry out the reaction at an elevated temperature and preferably in a two stage counter-current operation in order to ensure that the dicalcium phosphate contains the minimum amount of more basic calcium phosphate of the hydroxyapatite type. As the dicalcium phosphate so produced is in equilibrium with a liquor having a pH in excess of 8, this procedure is effective.

EXAMPLE I

For a charge of three hundred pounds of ore containing 34% $P_2O_5$, a plant may take the form indicated in FIG. 2.

The slurry in the leaching and washing section consists of pretreated ore and a liquor which is a blend of recycled primary phosphate liquor and wash liquor obtained in washing with water of the leach residue. Sodium sulphate and sulphuric acid are added to the slurry, the rate of addition of the acid being important as affording a means for controlling crystal size of the calcium sulphate, and for limiting the pH of the slurry keeping the pH at a maximum consistent with operating conditions.

The vessels, preferably three in series, have a total capacity for four hours residence time. The acid is added so that only 10 to 15% of the acid is added in the last vessel. The slurry is passed to a holding tank having a capacity for a residence time of one hour during which equilibrium is established. The above operations are carried out at 60–10° C.

The solids separated from the slurry are washed with water in an amount dictated by the $P_2O_5$ concentration objective in the secondary liquor. The primary phosphate liquor and the washings are kept separate, but a portion of the former is recycled to the leach operation to dilute the slurry.

The balance of the phosphate liquor is then contacted for a minimum of one hour at a temperature of 60° C. (plus) with finely ground phosphate ore to yield pretreated ore and the secondary phosphate liquor, which are recovered separately. The former is recycled to the leach operation while the latter is neutralized.

Neutralization is effected using dicalcium phosphate in a three stage counter-current operation, using a repulper and thickener in each stage. The underflow and overflow products from the latter pass in opposite directions. The overflow from the last stage of neutralization has a pH of 2.0/2.2, while the underflow from the first stage which contains dicalcium phosphate is recycled to the ore pretreatment operation. To achieve equilibrium at each stage of repulping, the operation is carried out at 60/70° C. in a vessel large enough to allow a residence time of at least one hour.

The liquid product from above is then neutralized in a single stage operation using disodium phosphate liquor as the neutralizing agent. The final pH is 3.5/3.8 and the operation is carried out preferably at a temperature in excess of 70° C. in a vessel which allows of a residence time of one hour at least. Provision is made for the filtration of the resultant slurry to remove the iron and aluminum phosphates and the silicofluoride. The filter cake is washed and then discarded or otherwise disposed of, while the filtrate comprises the tertiary phosphate liquor.

A portion of the latter is treated with slaked lime slurry in two countercurrent stages in order to effect a conversion of the contained phosphate to the dicalcium and disodium salts, used as indicated above. This operation is carried out at an elevated temperature and a residence time of one hour is necessary. The object of the countercurrent operation is to insure that the calcium salt approximates the dicalcium salt, and not the more alkaline hydroxyapatite type of phosphate.

Evaporation of the tertiary phosphate liquor and subsequent crystallization of the monosodium salt follow conventional lines.

A number of advantages accrue from the process, a major advantage being the economics involved where sodium sulphate is a less expensive source of sodium than soda ash.

A second advantage resides in the reduction in the amount of sulphuric acid required to yield an equivalent amount of monosodium phosphate. Pilot plant tests have shown acid consumptions of 1.7 to 1.8 lbs. of acid per lb. of $P_2O_5$ as against 2.5 to 2.6 lbs. for conventional operations.

A further advantage resides in the appreciable decrease in the amount of unwanted impurities obtained in the leaching operation because of the relatively high pH maintained during the leaching operation. In conventional processes making 30% $P_2O_5$ phosphoric acid, the final pH is in the order of minus 0.24, whereas using sodium sulphate, the pH is less than unity for a short period of time and never below 0.8.

For instance, an ore containing 10% $Fe_2O_3$ was treated with sodium sulphate to yield a primary phosphate liquor containing only 4 gm. $Fe_2O_3$ and 1 gm. fluorine per liter.

A further advantage is in an appreciable reduction in the cost of the plant. All operations including leaching can be carried out in open top rubber-lined tanks. During pilot plant operations, there was no evidence of fluorine containing vapours. In addition, mechanical agitators could be eliminated as only relatively mild agitation is required.

A further advantage exists in the ability to use salt in the process as a source of sodium, following the steps of Equations VI, VII and VIII, the sulphuric acid and sodium bisulphate of Equation VI being used in the leaching operation, the hydrochloric acid produced reacting with water and ore according to Equations VII and VIII. (In the step of Equation VIII, calcium carbonate may be used instead of lime to precipitate the dicalcium phosphate.)

The precipitated dicalcium phosphate may then be reacted according to Equation IX to form the desired dihydrogen phosphate product. The reaction of Equation IX is preferably carried out in conjunction with the leaching of ore with sodium sulphate and sulphuric acid, and the neutralization of the resultant liquor so as to make full use of the neutralization effect of the dicalcium phosphate.

Having now particularly described and ascertained my said invention and in what manner the same is to be performed, I declare that what I claim is:

What is claimed is:

1. A process for the production, from calcium phosphate containing ores, of crystals of alkali metal dihydrogen phosphate having the general formula $RH_2PO_4$, wherein R represents an alkali metal selected from the class consisting of sodium and potassium, comprising the steps of treating a batch of the ore in a leaching and washing step with an amount of sulphuric acid which is insufficient to combine with all of the available calcium present and with a water soluble alkali metal sulphate in a reaction of the type $$Ca_3(PO_4)_2 + 2H_2SO_4 + R_2SO_4 = 2RH_2PO_4 + 3CaSO_4$$
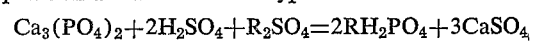

to form a slurry containing insoluble calcium sulphate, phosphoric acid, unreacted alkali metal sulphate and alkali metal dihydrogen phosphate, having a pH between 0.8 and 1.0;

separating from the slurry primary phosphate liquor consisting essentially of phosphoric acid, unreacted alkali metal sulphate, and alkali metal dihydrogen phosphate;

reacting the primary phosphate liquor with further calcium phosphate containing ore in a reaction of the type $$Ca_3(PO_4)_2 + 4H_3PO_4 + 3R_2SO_4 = 6RH_2PO_4 + 3CaSO_4$$

to form a second slurry which includes insoluble calcium sulphate, an increased amount of alkali metal dihydrogen phosphate, unreacted alkali metal sulphate and phosphoric acid, having a pH between 1.5 and 1.6, the second slurry having less than 50 percent of its $P_2O_5$ content as free phosphoric acid;

separating from said second slurry a secondary phosphate liquor consisting essentially of phosphoric acid, unreacted alkali metal sulphate and the increased amount of alkali metal dihydrogen phosphate;

neutralizing said secondary phosphate liquor with a neutralizing agent selected from the class consisting essentially of dicalcium phosphate, any more basic calcium phosphate, slaked lime, sodium carbonate and sodium hydroxide in the reaction of the type $$H_3PO_4 + CaHPO_4 + R_2SO_4 = 2RH_2PO_4 + CaSO_4$$

to form a third slurry containing additional amounts of alkali metal dihydrogen phosphate, insoluble calcium sulphate, and phosphoric acid;

the neutralization being in an amount sufficient to increase the pH to less than 4, and to increase the concentration of the alkali metal dihydrogen phosphate to the point where it can be crystallized;

separating from said third slurry a third liquor containing alkali metal dihydrogen phosphate and phosphoric acid;

effecting crystallization of alkali metal dihydrogen phosphate;

and recovering alkali metal dihydrogen phosphate crystals.

2. A process according to claim 1 wherein the batch of calcium phosphate containing ore used in the leaching and washing step comprises insoluble materials separated from said second slurry, and wherein raw calcium phosphate containing ore is reacted with said primary liquor to form said second slurry.

3. A process according to claim 1 wherein the neutralization is effected with dicalcium phosphate and the third slurry contains a solid equilibrium product consisting essentially of calcium sulphate and dicalcium phosphate, wherein the solid equilibrium product is recycled to react with the primary liquor for recovery of the $P_2O_5$ content therein.

4. A process according to claim 1 wherein the liquor remaining after crystallization of the alkali metal dihydrogen phosphate is recycled and combined with said secondary phosphate liquor, with which it is subjected to neutralization.

5. A process according to claim 1 in which said alkali metal sulphate is sodium sulphate.

6. A process according to claim 1 wherein the neutralization is to a pH between 3.5 and 4.

References Cited by the Examiner
UNITED STATES PATENTS

| | | | |
|---|---|---|---|
| 418,259 | 12/89 | Winssinger | 23—109 |
| 1,357,120 | 10/20 | Sadtler | 23—107 |
| 1,383,990 | 7/21 | Kelly | 23—107 |
| 1,866,657 | 7/32 | Levermore | 23—107 |
| 2,767,045 | 10/56 | McCullough | 23—109 |
| 2,869,997 | 1/59 | Atkin | 23—109 |

MAURICE A. BRINDISI, *Primary Examiner.*

UNITED STATES PATENT OFFICE
CERTIFICATE OF CORRECTION

Patent No. 3,211,523                                October 12, 1965

Francis L. Melvill

It is hereby certified that error appears in the above numbered patent requiring correction and that the said Letters Patent should read as corrected below.

Column 1, line 33, for "alterating" read -- alteration --; line 46, for "ontaminated" read -- contaminated --; column 2, line 69, for "insouble" read -- insoluble --; column 6, line 69, for "60-10° C." read -- 60-70° C. --.

Signed and sealed this 21st day of June 1966.

(SEAL)
Attest:

ERNEST W. SWIDER                                      EDWARD J. BRENNER
Attesting Officer                                          Commissioner of Patents